United States Patent
Bodnar et al.

(10) Patent No.: US 9,296,631 B2
(45) Date of Patent: Mar. 29, 2016

(54) PREPARATION OF ENVIRONMENTALLY ACCEPTABLE SCALE INHIBITORS

(75) Inventors: Scot H. Bodnar, Houston, TX (US); Henry C. Fisher, Dickinson, TX (US); Andrew Frederick Miles, Aberdeenshire (GB); Curtis D. Sitz, Katy, TX (US)

(73) Assignee: Ecolab USA Inc., St. Paul, MN (US)

( * ) Notice: Subject to any disclaimer, the term of this patent is extended or adjusted under 35 U.S.C. 154(b) by 1698 days.

(21) Appl. No.: 12/492,825

(22) Filed: Jun. 26, 2009

(65) Prior Publication Data

US 2010/0163494 A1 Jul. 1, 2010

Related U.S. Application Data

(60) Provisional application No. 61/077,093, filed on Jun. 30, 2008.

(51) Int. Cl.
*C02F 5/14* (2006.01)
*C02F 5/12* (2006.01)
*C02F 103/10* (2006.01)

(52) U.S. Cl.
CPC ... *C02F 5/12* (2013.01); *C02F 5/14* (2013.01); *C02F 2103/10* (2013.01)

(58) Field of Classification Search
USPC ........................................................ 210/700
See application file for complete search history.

(56) References Cited

U.S. PATENT DOCUMENTS 5,360,065 A * 11/1994 Falk .......................... 166/250.05
5,478,476 A * 12/1995 Dragisich ..................... 210/700

FOREIGN PATENT DOCUMENTS

WO     WO2008017338 A2    2/2008

OTHER PUBLICATIONS

PCT Notification "International Search Report and Written Opinion", Oct. 19, 2009, pp. 1-12.

* cited by examiner

*Primary Examiner* — Tony G Soohoo
*Assistant Examiner* — Peter Keyworth
(74) *Attorney, Agent, or Firm* — Senniger Powers LLP (57) ABSTRACT

Alkyl phosphonates prepared from amino acids suitable for use in inhibiting scale. The phosphonates are obtained as reaction mixtures where the level of alkyl phosphonation is deliberately controlled to provide only partial alkyl phosphonation of the amino acid. The resulting alkyl phosphonates exhibit improved environmental properties compared to the fully substituted species, while still exhibiting acceptable efficacy in the control of scale. The compositions possess advantages over existing phosphonates in that they exhibit higher biodegradation by method OECD 306. They also offer lower toxicity to marine life compared to the fully substituted species and are not expected to bioaccumulate.

26 Claims, 5 Drawing Sheets

* Additional HCl used within some of the examples described.

Phosphonic Acids Prepared from Hydrochloride Salt of Lysine and Optimized for Di-substituted Products.

Figure 1. Phosphonic Acids Prepared from Hydrochloride Salt of Lysine and Optimized for Di-substituted Products.

* Additional HCl used within some of the examples described.

Figure 2. Percent Biodegradation (OECD 306) as a function of time for reaction mixtures of methyl phosphonated lysine described in Examples 1-5.

Figure 3. Percent Biodegradation (OECD 306) as a function of time for reaction mixtures of methyl phosphonated lysine described in Examples 6-9.

Figure 4. Averaged OECD 306 Biodegradation Data Comparing Compositions within Preferred Embodiments and those Described in the Prior Art.

Figure 5. Percent Biodegradation (OECD 306) as a function of time for methyl phosphonates of other amino acids according to Examples 10-12 and 14-15.

PREPARATION OF ENVIRONMENTALLY ACCEPTABLE SCALE INHIBITORS

STATEMENT OF RELATED APPLICATIONS

This application claims priority of U.S. Provisional Patent Application No. 61/077,093 filed on Jun. 30, 2008.

BACKGROUND OF THE INVENTION

1. Field of the Invention

The present invention relates to the preparation of amino phosphonate scale inhibitors that have improved environmental properties, compared with traditional phosphonic acids used in the industry.

2. Background of the Related Art

Scale formation is a problem in many situations including oilfield (surface and sub-surface operations), industrial water treatment, laundry, detergent, industrial and household cleaning applications. Generally speaking, the problem arises because the aqueous system contains cations, such as calcium, barium and magnesium along with anions such as bi-carbonate, carbonate and sulfate. If the combination of cations and anions remain solubilized within the water system they typically do not cause concern. However, if the systems are perturbed in any way, leading to the concentration of ions present exceeding the solubility limits for that particular water system, precipitation of scale can occur. These perturbations can include water evaporation (concentration), mixing of incompatible waters, pH changes, as well as pressure or temperature changes. Common scales include calcium carbonate ($CaCO_3$), barium sulfate ($BaSO_4$) and strontium sulfate ($SrSO_4$), but may also include other scales such as iron sulfide ($Fe_xS_y$) or lead sulfide (PbS). If left untreated, scale deposits can have adverse effects including general fouling, reductions in the efficiency of a plant or equipment, mechanical failures, harboring bacteria, increased corrosion, or causing systems to be shut down for remediation.

A well known chemical treatment option for mitigating scale deposition is the use of threshold scale inhibitors. These include phosphates, phosphate esters, phosphonates and polymeric agents. The term "phosphonate" encompasses the group of molecules characterized by the presence of a covalent carbon-to-phosphorus (C—P) bond, most commonly as part of the following molecular fragment:

$-CH_2-P(O)(OH)_2$

More generally, this formula can be written:

$-R_1-P(O)(OH)_2$ where $R_1$ represents an alkyl group, such as methyl, ethyl, or butyl.

The term "phosphonate" and "phosphonic acid" are used interchangeable and are intended to encompass the same functional group since the two forms are dependent upon the prevailing alkalinity and acidity.

In addition, the hydrogen (H) atoms of one or more of the —OH groups can be replaced with monovalent cations such as sodium or potassium, divalent cations such as calcium, or nitrogen containing species such as ammonia or an amine, or combinations thereof, these variants usually being known as phosphonate 'salts'.

Within this more general class of phosphonates, it is also possible to distinguish the group known as amino phosphonates. The term "amino phosphonates" refers to the group of molecules characterized by the fragment:

$-N(R_2)-R_1-P(O)(OH)_2$ where $R_1$ represents an alkyl group as before, and where $R_2$ is selected from H, a second alkyl phosphonate group or another substituent such as $-R_1-OH$ etc. These molecules can be prepared as shown, or in the form of phosphonate 'salts' as described previously.

A beneficial aspect of many amino phosphonates is that they can be prepared in bulk and at relatively low cost. Although not limited to this example, the processes used to manufacture amino phosphonates include those disclosed in U.S. Pat. No. 3,288,846, where the amino phosphonate is prepared from a starting 'amine' containing one or more primary amino groups and which is reacted together with other ingredients to introduce onto each primary amine a (bis)phosphonoalkyl moiety. According to this process, each primary amino group is substituted with two ($-R_1-P(O)(OH)_2$) alkyl phosphonate substituents. These fully substituted amines have been found to be extremely effective as scale inhibitors, especially versus $BaSO_4$ scales.

Amino phosphonate scale inhibitors may be prepared from amines containing one or more primary or secondary amines, by substituting each amine group with one or two alkyl phosphonate species. Examples of these amino phosphonates include: monoethanolamine bis(methylene phosphonic acid) MEA [known to yield mainly a mixture of two products: the desired phosphonate and cyclized form of the molecule], ethylene diamine tetra kis(methylene phosphonic acid) EDTMPA, hexamethylene diamine tetra kis(methylene phosphonic acid) HMDTPA, diethylene triamine penta(methylene phosphonic acid) DETA, bis(hexamethylene) triamine penta (methylene phosphonic acid) BHMT and tri-ethylene tetra amine hexa(methylene phosphonic acid) TETHMPA.

U.S. Pat. No. 5,087,376 describes compositions and methods for inhibiting scale formation with reference to preferred species including N,N-bis(phosphonomethyl) cysteic acid and N,N-bis(phosphonomethyl) glycine. The patent also describes N,N-bis(phosphonomethyl) taurine, which is prepared from an amino sulfonic acid. The species N,N-bis(phosphonomethyl) cysteic acid and N,N-bis(phosphonomethyl) glycine are fully substituted (phosphonomethylated) analogues of the amino acids cysteine and glycine, where each of these amino acids contain one primary amine group per molecule.

U.S. Pat. Nos. 5,414,112 and 5,478,476 relate to phosphonomethyl amino acids which contain either carboxylic acid or sulfonic acid groups and their use in inhibiting $CaCO_3$ scale. More specifically, these patents disclose: (a) N,N-bis(phosphonomethyl) L-glutamic acid; (b) N,N-bis(phosphonomethyl) sulfanilic acid; (c) N,N-bis(phosphonomethyl) aniline-2-sulfonic acid; (d) N,N-bis(phosphonomethyl) L-serine and (e) N,N,N',N'-bis(phosphonomethyl) L-lysine. Again, the species N,N-bis(phosphonomethyl) L-glutamic acid and N,N-bis(phosphonomethyl) L-serine are the fully substituted (phosphonomethylated) analogues of the amino acids glutamic acid and serine, respectively, where each of these amino acids originally contains one primary amine group per molecule. The species N,N,N',N'-bis(phosphonomethyl) L-lysine is the fully substituted (phosphonomethylated) analogue of the amino acid L-Lysine, where L-Lysine amino acid originally contains two primary amino groups per molecule.

International Patent Application Publication WO 2008/017338 A2 relates to a method of scale inhibition, particularly barium scale inhibition, comprising the addition of a threshold amount of selected amino acid alkyl phosphonic acid scale inhibitors where the scale inhibitors can be selected from certain α-amino acid alkyl phosphonic acids and from amino acid species having a $C_2-C_{20}$ hydrocarbon group connecting the carboxyl and amine moieties. Amino acid alkyl phosphonic acids may be prepared by the reaction between an amino acid, phosphorous acid, formaldehyde and hydrochloric acid. This reaction produces a mixture of amino acid alkyl phosphonic acids that vary in their degree of phosphonic acid substitution of the available N—H functions. By varying the stoichiometric proportions of the reactants, separate reaction mixtures were prepared. For example, one reaction mixture contained 72.2% L-lysine tetra-phosphonic acid and another reaction mixture contained 52.1% L-lysine tetra-phosphonic acid ("lysine tetra"), respectively, mixed with lesser amounts of L-lysine di-phosphonic acid ("lysine di"). In a preferred embodiment, the disclosure includes a mixture of lysine tetra and lysine di whereby the weight ratio of lysine tetra to lysine di is in the range of from about 9:1 to 1:1, even more preferably 7:2 to 4:2.

SUMMARY OF THE INVENTION

One embodiment of the invention includes partial phosphonoalkylation of natural and synthetic amino acids to obtain reaction mixtures which exhibit improved environmental properties, compared to corresponding fully substituted amino acid species, while exhibiting efficacy for use in the control of scale commonly found in oilfield, industrial water treatment, laundry, detergent, industrial and household cleaning applications.

In another embodiment, the invention includes partial phosphonoalkylation of D- and L-Lysine amino acids and all mixtures thereof to obtain reaction mixtures rich in di-substituted alkyl phosphonated species, such as di-substituted methyl phosphonated species, which exhibit improved environmental properties, compared to the fully substituted species, while exhibiting efficacy for use in the control of scale commonly found in oilfield, industrial water treatment, laundry, detergent, industrial and household cleaning applications.

Yet another embodiment of the invention includes a method of inhibiting scale. The method comprises contacting an aqueous fluid with a scale inhibitor in an amount effective to inhibit scale, wherein the scale inhibitor includes a mixture of methyl phosphonated lysine species including greater than about 50 weight percent di-substituted methyl phosphonated lysine, and wherein the scale inhibitor demonstrates greater than about 20% biodegradation in 28 days when tested according to method OECD 306.

A still further embodiment provides a method of inhibiting scale comprising contacting an aqueous fluid with a scale inhibitor component in an amount effective to inhibit scale, wherein the scale inhibitor component includes at least one alkyl phosphonated amino acid species that comprises greater than 50 weight percent partially substituted, di-alkyl phosphonated amino acid species, and wherein the scale inhibitor component demonstrates greater than about 20% biodegradation in 28 days when tested according to method OECD 306.

One embodiment provides a method comprising controlling the degree of phosphonoalkylation of one or more amino acid species having at least four active hydrogen atoms to produce an effective scale inhibitor composition including at least one alkylphosphonated amino acid species, wherein the at least one alkylphosphonated amino acid species includes greater than 50 weight percent di-substituted alkyl phosphonated amino species and demonstrates greater than about 20% biodegradation in 28 days when tested according to method OECD 306.

Another embodiment provides a scale inhibitor formulation, comprising a solvent, and a scale inhibitor composition within the solvent, wherein the scale inhibitor composition includes at least one alkyl phosphonated amino acid species, wherein greater than 50 weight percent of the at least one alkyl phosphonated amino acid species is a lysine functionality that is di-substituted with alkyl phosphonate groups, and wherein the scale inhibitor composition demonstrates greater than about 20% biodegradation in 28 days when tested according to method OECD 306.

DETAILED DESCRIPTION OF THE INVENTION

The present invention provides a method of controlling scale comprising adding to an aqueous fluid an effective scale inhibiting amount of amino acid alkyl phosphonates prepared from amino acids by deliberately controlling the level of alkyl phosphonation to provide improved environmental properties compared to fully substituted amino acid alkyl phosphonates, or mixtures of amino acid alkyl phosphonates including a major portion of the fully substituted species. Amino acid alkyl phosphonates or mixtures thereof that include a major portion of partially substituted, alkyl phosphonates have been discovered to exhibit higher biodegradation, for example when tested by method OECD 306, compared to the fully substituted species. They also offer improved toxicity to marine algae compared to the fully substituted species and are not expected to bioaccumulate.

Amino acid alkyl phosphonates may be prepared by the reaction of an amino acid with hydrochloric acid, phosphorous acid, and an aldehyde. Accordingly to the present invention, the stoichiometric ratios of the reactants are controlled to yield a major portion of partially substituted, alkyl phosphonates species. It should be recognized that in order to form a partially substituted, alkyl phosphonate species, it is necessary for the amino acid to have two or more amino groups that collectively provide three or more active hydrogen (N—H) functionalities.

Figure 1:
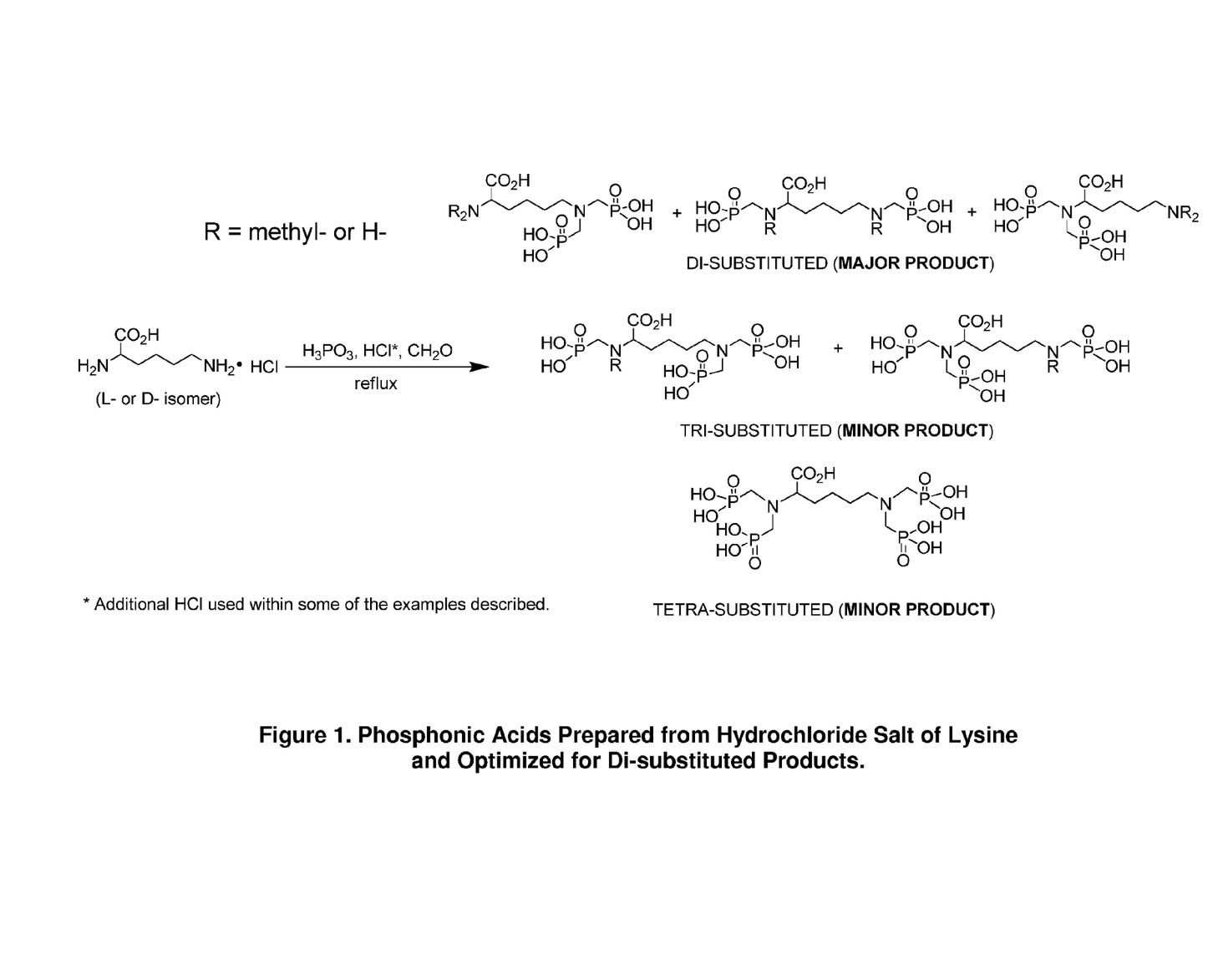
FIG. 1 is a reaction scheme summarizing the preparation of methyl phosphonic acids from hydrochloride salt of lysine, and containing a major portion of di-substituted products.

FIG. 1 shows the reaction of lysine (amino acid) with hydrochloric acid, phosphorous acid and formaldehyde to form a mixture of methyl phosphonates having a major portion (i.e., greater than 50 weight percent) of di-methyl phosphonated lysine. As referred to herein, the terms mono-phosphonates (not shown), di-phosphonates, tri-phosphonates and tetra-phosphonates refer to natural or synthetic amino acid structures having one, two, three or four alkyl phosphonate groups per molecule, respectively. Even higher levels of alkyl phosphonates substitution are possible when using amino acids with higher numbers of active hydrogens (N—H) per molecule.

The amino acids may be naturally occurring or synthetic species and must contain two or more amino groups that collectively provide three or more active hydrogen (N—H) functionalities and one or more carboxyl groups per molecule. Naturally occurring amino acids that meet these criteria for preparing partially substituted, alkyl phosphonates include amino acids selected from the group consisting of arginine, asparagine, glutamine, histidine, lysine, hydroxylysine, ornithene, tryptophan, and combinations thereof. Non-limiting examples of synthetic amino acids suitable for preparing partially substituted, alkyl phosphonates include amino acids selected from the group consisting of D-isomers of examples above and generally any species with both amine(s) and carboxylic acid(s) functionalities.

Partially substituted, di-alkyl phosphonated amino acid species include two alkyl phosphonate groups, each having an alkyl group or moiety with from one to three carbons. Preferably, the alkyl group is a methyl group. In accordance with the reaction of FIG. 1, the methyl group is incorporated into the molecule through selection of formaldehyde (methanal) as the aldehyde used in the reaction. Alkyl groups with two or three carbons may be incorporated by using acetaldehyde (ethanal) or propionaldehyde (propanal), respectively, in the reaction. Longer chain alkyl groups may also be used in accordance with the invention.

In order to carry out the reaction of FIG. 1 in a manner that yields greater than 50% of a partially substituted, di-alkyl phosphonated amino acid species, the reactant ratios must be carefully controlled. Ratios of phosphorous acid to lysine range from 1:1 to 2:1 and ratios of aldehyde to lysine range from 1:1 to 2:1. The reaction is preferably supported by the inclusion of an acid catalyst, providing the lysine in the form of a hydrochloride salt, or some combination thereof. When hydrochloric acid is used in combination with a hydrochloride salt form of the lysine, it is preferably used in an amount not to exceed a hydrochloric acid to amino acid ratio of 2:1.

Synthesis and Analysis

The following Examples describe the methods and conditions used to prepare alkyl phosphonated amino acids, analyze the reaction products, and test the reaction products for scale inhibition, biodegradation, toxicity and bioaccumulation. The specific examples described below are used to be illustrative, and not intended to restrict the broader scope of the invention.

EXAMPLE 1

To a two hundred fifty milliliter multi-neck flask equipped with a mechanical stirrer, a reflux condenser, a thermoprobe connected to a temperature controller and inlet for nitrogen purge, 63 grams of aqueous phosphorous acid (70%, 0.54 mol, 2 equiv.) was charged. To the stirring acid, 50 grams of lysine monohydrochloride (HCl) (98%, 0.27 mol, 1 equiv.) was charged to the reaction vessel under good agitation, along with 30 grams of deionized water which was added to help dissolve the solid into solution. The reaction mixture was then heated to 93° C. and purged with nitrogen. The solid paraformaldehyde (18 grams, 91%, 0.54 mol, 2 equiv.) was added in equal-weighted portions over a period of time to limit excess heating. Once the addition of paraformaldehyde was complete, the reaction mixture was heated to 110° C. and allowed to reflux overnight. The reaction mixture was then cooled to room temperature and sampled for analysis.

The resultant phosphonate solution had a solids content of 63% by Non-Volatile Residue (NVR) analysis, 6.1% chloride determined by potentiometric titration and a calcium chelation value (CCV) of 131 mg $CaCO_3$ per gram sample. Analysis by Ion Chromatography-Mass Selective Detection (IC/MSD) shows that the lysine reaction mixture contains di-, tri- and tetra-substituted methyl phosphonates in a ratio of 5.7: 2.4:1.0.

EXAMPLE 2

The procedure of Example 1 was repeated with 26 grams of aqueous hydrochloric acid (37%, 0.27 mol, 1 equiv.) added to the phosphorous acid before addition of lysine HCl. The resultant phosphonate solution had a solids content of 55% by NVR analysis, 10% chloride level and a CCV of 115 mg $CaCO_3$ per gram sample. Analysis by IC/MSD shows that the reaction mixture contains di-, tri- and tetra-substituted methyl phosphonates in a ratio of 2.2:1.0:1.6.

EXAMPLE 3

To a three liter multi-neck flask equipped with a mechanical stirrer, a reflux condenser, a temperature probe and inlet for nitrogen purge, 502 grams of aqueous phosphorous acid (70%, 4.34 mol, 1.5 equiv.) was charged. To the stiffing acid, 535 grams of lysine HCl (98%, 2.87 mol, 1 equiv.) was charged to the reaction vessel under good agitation, along with 321 grams of deionized water which was added to help dissolve the solid into solution. The reaction mixture was then heated to 93° C. and purged with nitrogen. The solid paraformaldehyde (142 grams, 91%, 4.31 mol, 1.5 equiv.) was added in equal-weighted shots over a period of time to limit excess heating. Once the addition of paraformaldehyde was complete, the reaction mixture was heated to 110° C. and allowed to reflux overnight. The reaction mixture was then cooled to room temperature and sampled for analysis.

The resultant phosphonate solution had a solids content of 63% by NVR analysis, 8.4% chloride level and a CCV of 40 mg $CaCO_3$ per gram sample. Analysis by IC/MSD shows that the reaction mixture contains di- and tri-substituted methyl phosphonates in a ratio of 4.3:1.0. Lysine tetra-phosphonate was not detected in this sample.

EXAMPLE 4

The procedure from Example 3 was repeated with 582 grams of aqueous phosphorous acid (5.04 mol, 2 equiv.) added to the reactor, followed by 470 grams of lysine HCl (2.52 mol, 1 equiv.), 282 grams of deionized water, and 166 grams of paraformaldehyde (5.04 mol, 2 equiv.) was added in portions over time.

The resultant phosphonate solution had a solids content of 61% by NVR analysis, 7.8% chloride level and a CCV of 142 mg $CaCO_3$ per gram sample. Analysis by IC/MSD shows that the reaction mixture contains di- and tri-substituted methyl phosphonates in a ratio of 1.8:1.0. Lysine tetra-phosphonate was also not detected in this sample.

EXAMPLE 5

The procedure from Example 3 was repeated with 399 grams of aqueous phosphorous acid (3.45 mol, 1.5 equiv.) and 262 grams of manufacturing grade hydrochloric acid (32%, 2.28 mol, 1 equiv.) added to the reactor. Once the two acids were mixed, 429 grams of lysine HCl (2.30 mol, 1 equiv.) was added, followed by 257 grams of deionized water and 152 grams of paraformaldehyde (4.61 mol, 2 equiv.). The resultant phosphonate solution had a solids content of 56% by NVR analysis, 12% chloride level and a CCV of 97 mg $CaCO_3$ per gram sample. Analysis by IC/MSD shows that the reaction mixture contains di-, tri- and tetra-substituted methyl phosphonates in a ratio of 2.5:1.1:1.0.

EXAMPLE 6

The procedure for Example 1 was repeated with 64 grams of aqueous phosphorous acid (70%, 0.54 mol, 2 equiv.) Solid L-lysine HCl (50 grams, 98%, 0.27 mol, 1 equiv.) was added to the stiffing acid along with 30 grams of deionized water. Once the lysine was dissolved and the reactor reached 93° C., 27 grams of paraformaldehyde (91%, 0.80 mol, 3 equiv.) was added in portions over time.

The resultant phosphonate solution had a solids content of 67% by NVR analysis, 5.4% chloride level and a CCV of 209 mg $CaCO_3$ per gram sample. Analysis by IC/MSD shows that the reaction mixture contains di-, tri- and tetra-substituted methyl phosphonates in a ratio of 1.0:1.0:1.1.

EXAMPLE 7

The procedure for Example 1 was repeated with 186 grams of aqueous phosphorous acid (70%, 1.6 mol, 3 equiv.) and 53 grams of aqueous hydrochloric acid (37%, 0.54 mol, 1 equiv.). Solid L-lysine HCl (100 grams, 98%, 0.54 mol, 1 equiv.) was added to the stirring acids along with 60 grams of deionized water. Once the lysine was dissolved and the reactor reached 93° C., 53 grams of paraformaldehyde (91%, 1.6 mol, 3 equiv.) was added in portions over time.

The resultant phosphonate solution had a solids content of 59% by NVR analysis, 9.1% chloride level and a CCV of 173 mg $CaCO_3$ per gram sample. Analysis by IC/MSD shows that the reaction mixture contains di-, tri- and tetra-substituted methyl phosphonates in a ratio of 1.5:1.0:3.0.

EXAMPLE 8

The procedure for Example 1 was repeated with 126 grams of aqueous phosphorous acid (70%, 1.1 mol, 4 equiv.) Solid L-lysine HCl (50 grams, 98%, 0.27 mol, 1 equiv.) was added to the stiffing acid along with 30 grams of deionized water. Once the lysine was dissolved and the reactor reached 93° C., 35 grams of paraformaldehyde (91%, 1.1 mol, 4 equiv.) was added in portions over time.

The resultant phosphonate solution had a solids content of 62% by NVR analysis, 4.0% chloride level and a CCV of 140 mg $CaCO_3$ per gram sample. Analysis by IC/MSD shows that the reaction mixture contains di-, tri- and tetra-substituted methyl phosphonates in a ratio of 1.0:2.0:4.6.

EXAMPLE 9

The procedure for Example 1 was repeated with 77 grams of aqueous phosphorous acid (70%, 0.64 mol, 4 equiv.) and 63 grams of aqueous hydrochloric acid (37%, 0.64 mol, 4 equiv.). Solid L-lysine HCl (30 grams, 98%, 0.16 mol, 1 equiv.) was added to the stirring acids. Once the lysine was dissolved and the reactor reached 93° C., 42 grams of paraformaldehyde (91%, 1.3 mol, 8 equiv.) was added in portions over time.

The resultant phosphonate solution had a solids content of 52% by NVR analysis, 11.5% chloride level and a CCV of 154 mg $CaCO_3$ per gram sample. Analysis by IC/MSD shows that the reaction mixture contains di-, tri- and tetra-substituted methyl phosphonates in a ratio of 1.0:4.0:9.0.

EXAMPLE 10

The procedure for Example 1 was repeated with 66 grams of aqueous phosphorous acid (70%, 0.57 mol., 2 equiv.) and 28 grams of aqueous hydrochloric acid (37%, 0.28 mol, 1 equiv.). Solid L-arginine (50 grams, 99%, 0.28 mol, 1 equiv.) was added to the stirring acids along with 30 grams of deionized water. Once the arginine was dissolved and the reactor reached 93° C., 19 grams of paraformaldehyde (91%, 0.57 mol, 2 equiv.) was added in portions over time.

The resultant phosphonate solution had a solids content of 60% by NVR analysis, 5.5% chloride level and a CCV of 177 mg $CaCO_3$ per gram sample. Analysis by IC/MSD along with Phosphorus-31 nuclear magnetic resonance (P-31 NMR) spectroscopy shows that the reaction mixture contains primarily di-substituted methyl phosphonate.

EXAMPLE 11

The procedure for Example 1 was repeated with 67 grams of aqueous phosphorous acid (70%, 0.57 mol, 2 equiv.) and 56 grams of aqueous hydrochloric acid (37%, 0.57 mol, 2 equiv.). Solid L-arginine (50 grams, 99%, 0.28 mol, 1 equiv.) was added to the stirring acids along with 30 grams of deionized water. Once the arginine was dissolved and the reactor reached 93° C., 19 grams of paraformaldehyde (91%, 0.57 mol, 2 equiv.) was added in portions over time.

The resultant phosphonate solution had a solids content of 56% by NVR analysis, 10% chloride level and a CCV of 120 mg $CaCO_3$ per gram sample. Analysis by IC/MSD along with P-31 NMR shows that the reaction mixture contains primarily di-substituted methyl phosphonate.

EXAMPLE 12

The procedure for Example 1 was repeated with 75 grams of aqueous phosphorous acid (70%, 0.64 mol, 2 equiv.) and 31 grams of aqueous hydrochloric acid (37%, 0.32 mol, 1 equiv.). Solid L-histidine (50 grams, 99%, 0.32 mol, 1 equiv.) was added to the stirring acids along with 30 grams of deionized water. Once the histidine was dissolved and the reactor reached 93° C., 21 grams of paraformaldehyde (91%, 0.64 mol, 2 equiv.) was added in portions over time.

The resultant phosphonate solution had a solids content of 65% by NVR analysis, 6.0% chloride level and a CCV of 30 mg $CaCO_3$ per gram sample. Analysis by IC/MSD along with P-31 NMR shows that the reaction mixture contains primarily di-substituted methyl phosphonate.

EXAMPLE 13

The procedure for Example 1 was repeated with 75 grams of aqueous phosphorous acid (70%, 0.64 mol, 2 equiv.) and 63 grams of aqueous hydrochloric acid (37%, 0.64 mol, 2 equiv.). Solid L-histidine (50 grams, 99%, 0.32 mol, 1 equiv.) was added to the stirring acids along with 30 grams of deionized water. Once the histidine was dissolved and the reactor reached 93° C., 21 grams of paraformaldehyde (91%, 0.64 mol, 2 equiv.) was added in portions over time.

The resultant phosphonate solution had a solids content of 61% by NVR analysis, 11% chloride level and a CCV of 97 mg $CaCO_3$ per gram sample. Analysis by IC/MSD along with P-31 NMR shows that the reaction mixture contains primarily di-substituted methyl phosphonate.

EXAMPLE 14

The procedure for Example 1 was repeated with 85 grams of aqueous phosphorous acid (70%, 0.74 mol, 2 equiv.) and 73 grams of aqueous hydrochloric acid (37%, 0.74 mol, 2 equiv.). Solid L-asparagine (50 grams, 98%, 0.37 mol, 1 equiv.) was added to the stirring acids along with 30 grams of deionized water. Once the asparagine was dissolved and the reactor reached 93° C., 21 grams of paraformaldehyde (91%, 0.74 mol, 2 equiv.) was added in portions over time.

The resultant phosphonate solution had a solids content of 59% by NVR analysis, 12% chloride level and a CCV of 181 mg $CaCO_3$ per gram sample. Analysis by IC/MSD shows that the reaction product contains a mixture of desired di-substituted methyl phosphonate and phosphonates formed from the hydrolysis of the amino acid. P-31 NMR further supports that the majority of phosphorous species were converted to organic phosphonate.

EXAMPLE 15

The procedure for Example 1 was repeated with 85 grams of aqueous phosphorous acid (70%, 0.74 mol, 2 equiv.) and 73 grams of aqueous hydrochloric acid (37%, 0.74 mol, 2 equiv.). Solid L-asparagine (50 grams, 98%, 0.37 mol, 1 equiv.) was added to the stirring acids along with 30 grams of deionized water. Once the asparagine was dissolved and the reactor reached 93° C., 21 grams of paraformaldehyde (91%, 0.74 mol, 2 equiv.) was added in portions over time.

The resultant phosphonate solution had a solids content of 59% by NVR analysis, 11% chloride level and a CCV of 104 mg $CaCO_3$ per gram sample. Analysis by IC/MSD shows that the reaction product contains a mixture of desired di-substituted methyl phosphonate and phosphonates formed from the hydrolysis of the amino acid. P-31 NMR further supports that the majority of phosphorous species were converted to organic phosphonate.

Biodegradation, Ecotoxicity and Scale Inhibition

EXAMPLE 16

OECD 306 Biodegradation Tests

OECD 306 Biodegradation tests were performed using the standard 'closed bottle' method in accordance with Good Laboratory Practice (GLP) by a third party laboratory. Full details of the procedure and methods of calculation are publicly available in OECD documents. In all cases, the tests were performed without a substrate and the percent biodegradation was determined as a percentage of the measured chemical oxygen demand (COD).

Figure 2:
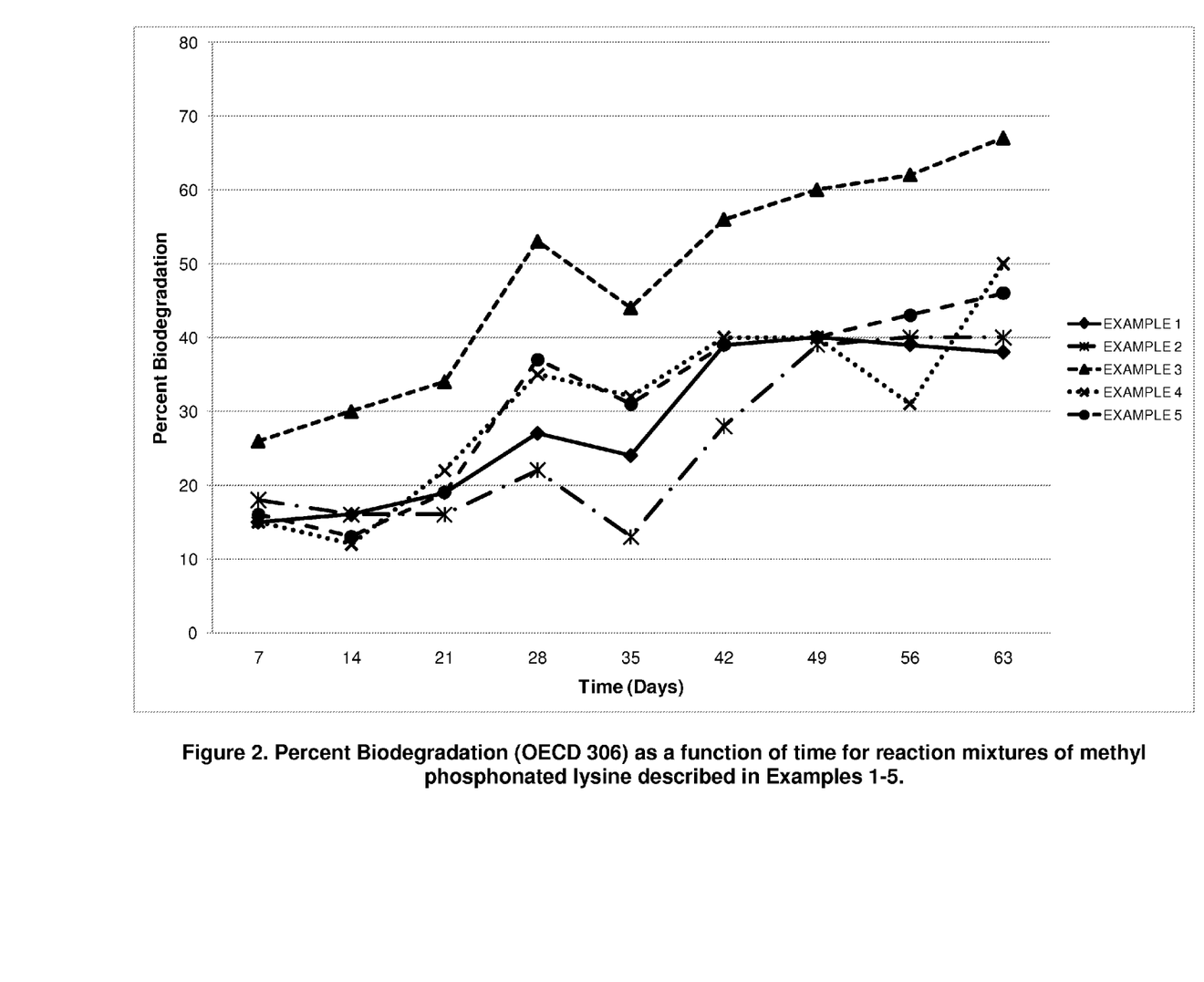
FIG. 2 is a graph of Percent Biodegradation as a function of time for reaction mixtures of methyl phosphonated lysine described in Examples 1-5.
Figure 3:
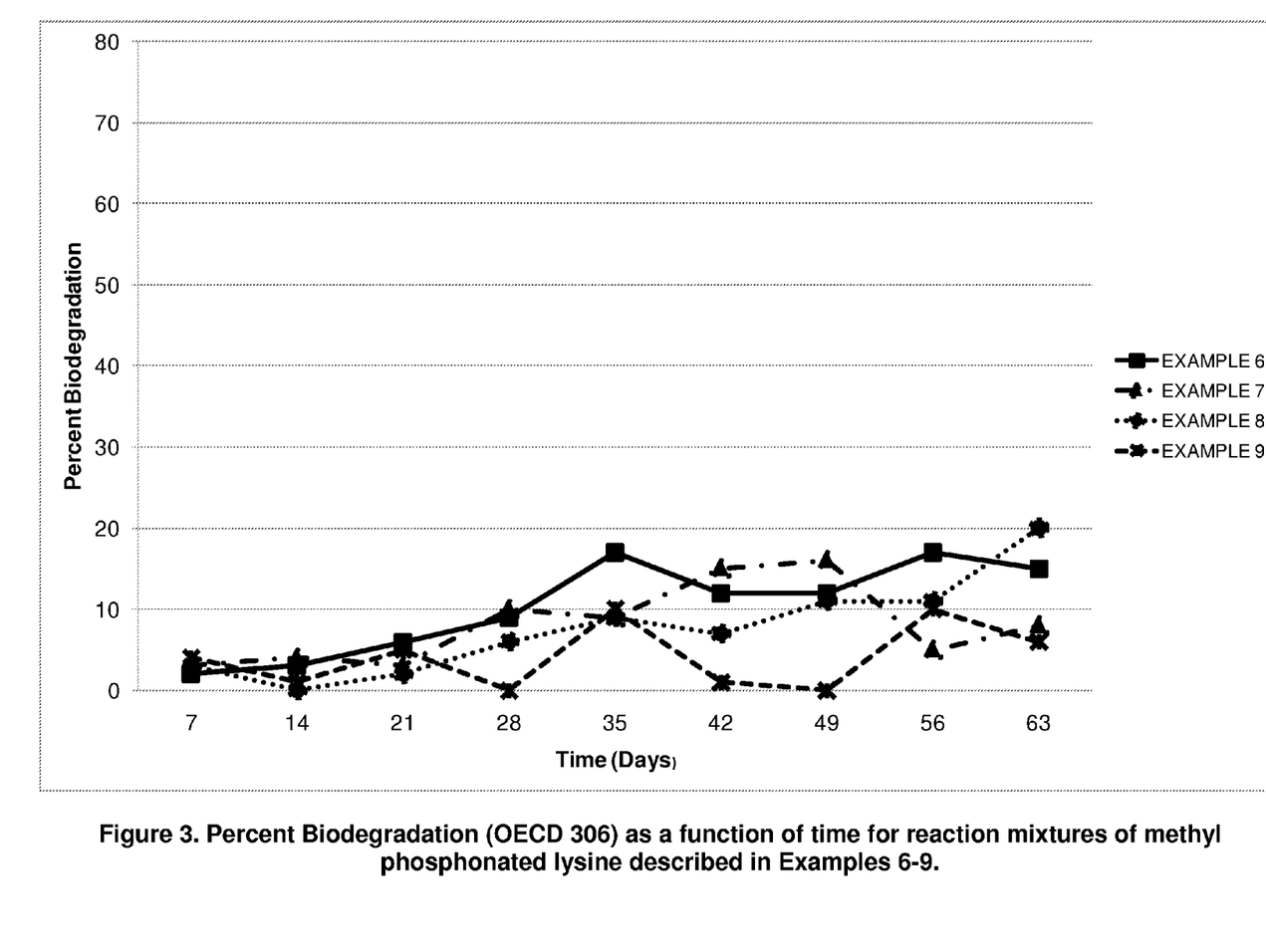
FIG. 3 is a graph of Percent Biodegradation as a function of time for reaction mixtures of methyl phosphonated lysine described in Examples 6-9.
Figure 4:
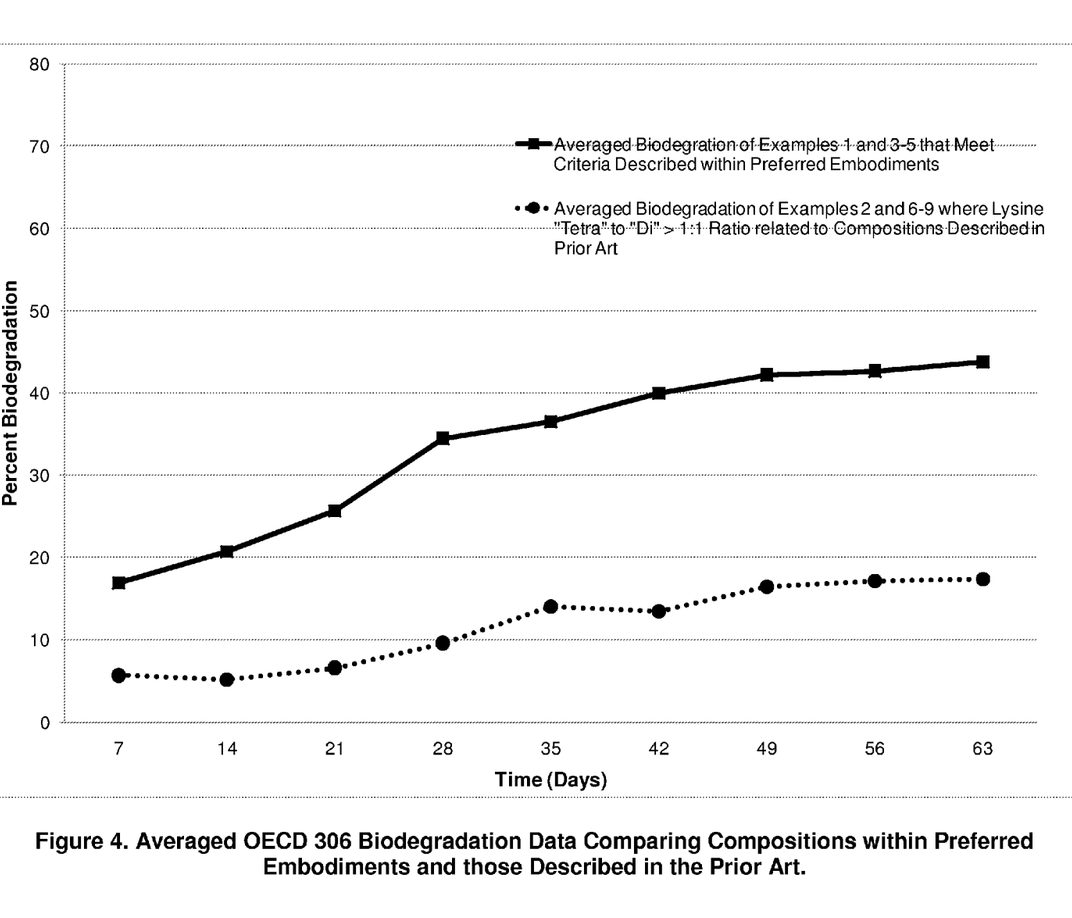
FIG. 4 a graph of Percent Biodegradation as a function of time comparing compositions within preferred embodiments and those that are not.
Figure 5:
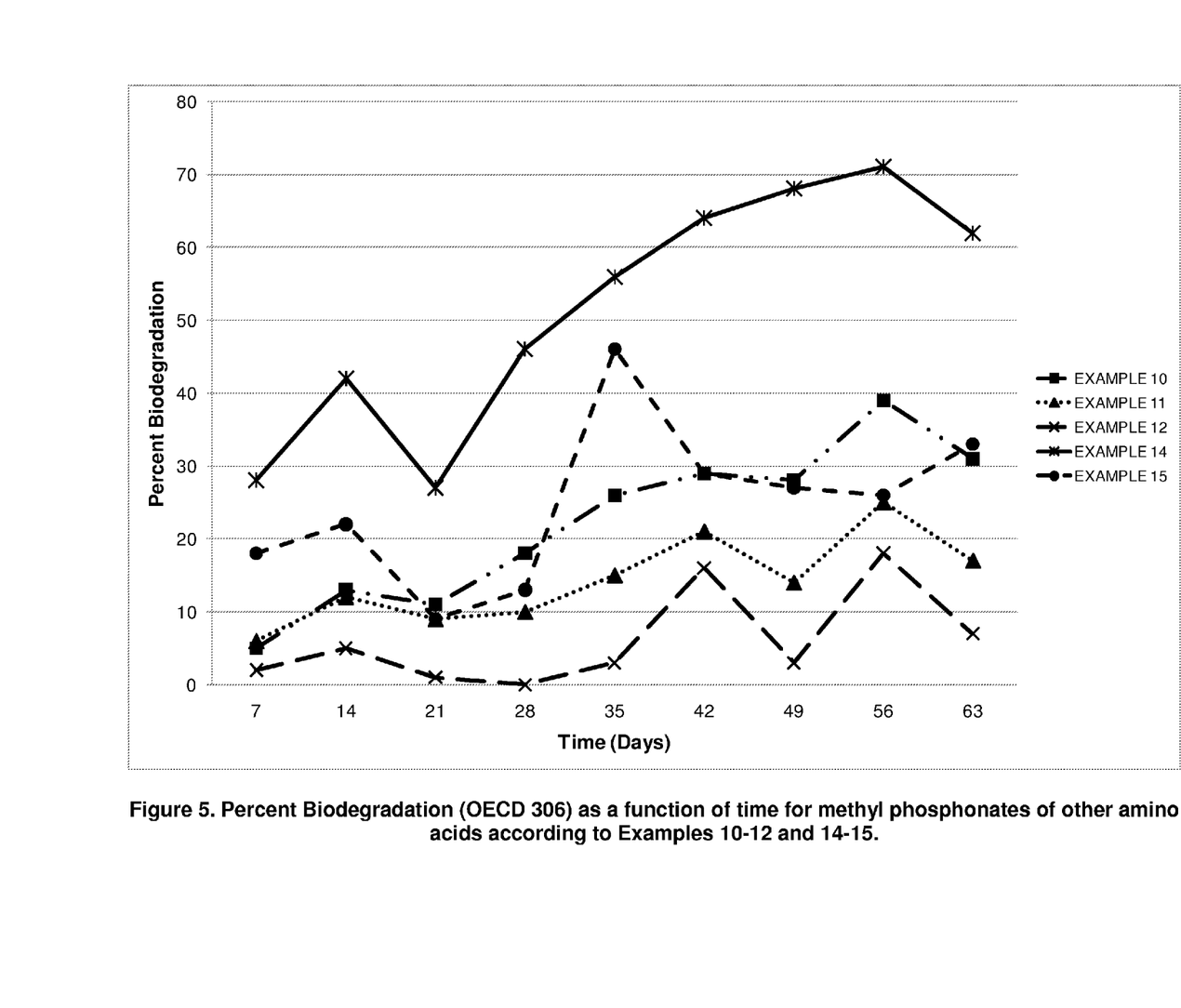
FIG. 5 is a graph of Percent Biodegradation as a function of time for methyl phosphonates of other amino acids according to Examples 10-12 and 14-15.

The percent biodegradation for the reaction products described in the Examples 1-15, above, are provided in Table 1. Furthermore, FIG. 2, FIG. 3 and FIG. 5 depicts the full set of OECD 306 data collected over the 63 day period. Each of the datasets presented in Table 1 and FIGS. 2 through 5 were obtained on the products as described in their acidic, non-neutralized forms.

Commercially available samples of amino phosphonates including MEA, DETA, BHMT and TETMPA, were also tested by the method OECD 306. Table 2 shows that these amino phosphonates were found to show biodegradation<7% in 28 days. In some cases the tests were extended for up to 63 days, although the maximum biodegradation by OECD 306 was also found to be <7%.

TABLE 1

Biodegradation Data for Example Phosphonates by OECD 306

| SAMPLE | BIODEGRADATION by OECD 306 | |
|---|---|---|
| | Max, 28 d (%) | Max, 63 d (%) |
| EXAMPLE 1 | 27 | 38 |
| EXAMPLE 2 | 22 | 40 |
| EXAMPLE 3 | 53 | 67 |
| EXAMPLE 4 | 35 | 50 |
| EXAMPLE 5 | 37 | 46 |
| EXAMPLE 6 | 9 | 15 |
| EXAMPLE 7 | 10 | 8 |
| EXAMPLE 8 | 6 | 20 |
| EXAMPLE 9 | 0 | 6 |
| EXAMPLE 10 | 18 | 31 |
| EXAMPLE 11 | 10 | 17 |
| EXAMPLE 12 | 0 | 7 |
| EXAMPLE 14 | 46 | 62 |
| EXAMPLE 15 | 13 | 33 |

TABLE 2

Biodegradation for Commercially Available Phosphonates by OECD 306

| SAMPLE | BIODEGRADATION by OECD 306 | |
|---|---|---|
| | Max, 28 d (%) | Max, 63 d (%) |
| MEA | 6 | 3 |
| BAEE | 0 | 5 |
| DETA | 0 | Stopped at Day 28 |
| BHMTPA | 6 | Stopped at Day 28 |
| TETHMPA | 0 | Stopped at Day 28 |

EXAMPLE 17

Algae Toxicity Tests

Algae toxicity tests were performed using the organism *Skeletonema costatum* or *Phaedactylum tricornum* in accordance with GLP and ISO/DIS protocol 10253 by a third party laboratory. Full details of the procedure and methods of calculation are given in the ISO/DIS documentation. The result is given as the 72 hour growth rate $EC_{50}$ value in mg/L. The algae toxicity of several of the reaction products described in the examples are provided in Table 3 below.

The protocols for toxicity testing determine either an $EC_{50}$, meaning the concentration of the test substance which results in a 50% response to the effect measured by the test, e.g. a reduction in growth or growth rate relative to the control within a defined time period of exposure, or an $LC_{50}$, meaning the median lethal concentration, i.e. the concentration of the test substance which kills 50% of a test batch of organisms within a defined period of exposure. The criterion currently in place requires the $EC_{50}$ or $LC_{50}$ to be greater than 10 mg/L within the relevant test period for each test species.

TABLE 3

Algae Toxicity Data for Example Phosphonates by ISO 10253

| SAMPLE | ALGAE (*Skeletonema costatum*) $EC_{50}$ (mg/L) |
|---|---|
| EXAMPLE 1 | 1230 |
| EXAMPLE 2 | 1488 |
| EXAMPLE 3 | 5254 |
| EXAMPLE 7 | 687 |

EXAMPLE 18

Scale Inhibitor Performance Using the Dynamic Loop Method

A number of scale inhibitor performance tests were undertaken using the dynamic loop method. This method is widely used in the oilfield service industry and is designed to evaluate the ability of a candidate scale inhibitor to delay the blockage of a small diameter metal capillary when injected with a scaling brine at constant flow rate under selected test conditions. The test conditions and water compositions are generally selected to represent, at least in-part, the process conditions under which a scale inhibitor might be deployed. The flow rate of the test brine is generally selected to allow the experiment to be performed in a repeatable and controlled manner. In this example, it was required to determine the performance of selected examples versus $CaCO_3$ scales.

Typically, one or more tests without any added scale inhibitor (blank tests) were performed in order to determine the scaling time for the un-inhibited brine under the given test conditions. Further tests were then performed where a known concentration of scale inhibitor was added to the test water. The deposition of scale was monitored by measuring the differential pressure ($\Delta P$) developed across the test capillary over time. If the scale inhibitor is effective (and the treat rate is appropriate) the total time before the capillary is restricted due to the build up of scale will be greater in the presence of the inhibitor than without the inhibitor. Alternatively, the concentration of the scale inhibitor can be reduced step-wise and the minimum inhibitor concentration (MIC) required for preventing a given increase in $\Delta P$ over a given time period can be determined. A candidate inhibitor with a time to fail that is significantly longer than the blank, or a product with a low MIC is usually preferred.

The apparatus for the tests included two HPLC type pumps connected to individual flow lines and pre-heating coils, a mixing section, the test capillary and an outflow section containing a back-pressure regulator. Static flow lines connected to a sensitive $\Delta P$ transducer were fitted at either end of the test capillary. The pre-heating coils, mixing section, test capillary and part of the outflow section were all contained within a thermostatically controlled oven.

The tests were performed using three different test brines, referred to as Fields I, II and III. Details of the ionic compositions of each brine is given in Table 4.

TABLE 4

Ionic Compositions of Test Brines

| Ion | Field I (mg/L) | Field II (mg/L) | Field III (mg/L) |
|---|---|---|---|
| Na | 12,658 | 33,900 | 32,038 |
| Ca | 729 | 2,554 | 4,609 |
| Mg | 100 | 111 | 373 |
| K | 313 | 2,096 | 1,581 |
| Sr | 127 | 534 | 716 |
| Ba | 203 | 1,618 | 1,456 |
| Cl | 21,569 | 58,000 | 61,076 |
| SO4 | 0 | 0 | 4 |
| HCO3 | 591 | 675 | 210 |
| CO3 | 0 | 0 | 0 |
| Fe | 0 | 0 | 0 |
| TDS | 36,290 | 99,488 | 102,063 |

To prepare the test water, each water composition was divided into two parts. The first water composition contained ½ of the total NaCl plus additional salts to provide the required concentrations of scaling cations (Ca, Ba, Sr etc). The second water composition contained the remaining ½ of the total NaCl, plus additional salts to provide the required concentrations of the scaling anions ($CO_3$, $HCO_3$ etc.). The pH of the individual waters was also measured and adjusted. When combined, the two waters were designed to provide the full ionic composition (as shown in Table 1) and to be at the required pH and temperature. However, the mixed waters would be super-saturated with respect to $CaCO_3$ scale.

The test capillary, approximately 1 meter long and having a 0.9 millimeter internal diameter, was manufactured from a corrosion resistant steel alloy. After leaving the test capillary, the mixed brines enter the outflow and back pressure regulator sections. The outflow is then passed to waste. Further details of the test conditions are given as Table 5. Also shown is the approximate scaling time for blank runs with no scale inhibitor present. The test capillary was not pre-scaled prior to starting the experiments. Following each test, the apparatus was cleaned using sequences of scale dissolver (acid) and de-ionised water.

TABLE 5

Details of Test Conditions for Dynamic Scale Loop Tests

| Property | Field I | Field II | Field III |
|---|---|---|---|
| Oven Temperature (C.) | 128 | 170 | 165 |
| Combined Flow Rate (mL/min) | 10 | 3 | 10 |
| pH of mixed brine (—) | 7.7 | 6.1 | 6.7 |
| Back-pressure (psi) | 200 | 220 | 200 |
| Pre-scale | none | none | none |
| Approx scaling time for blank (mins) | 15 | 15 | 7 |

A summary of the MIC values for selected candidates is shown Table 6. Unless otherwise shown, the MIC shown is the minimum concentration of inhibitor in parts per million (ppm) of total water required to obtain an increase in $\Delta P$ of less than 0.25 psid, more preferably less than 0.1 psid, over 1 hour. Where shown, the tests were extended to determine the MIC over 3 hours.

Polymer 1 is a commercially available scale inhibitor that exhibits biodegradation greater than 20% in 28 days when measured by OECD 306, but is relatively expensive. Phosphonate 1 (DETA phosphonate) is another, commercially available scale inhibitor, reported earlier to exhibit 0% biodegradation by OECD 306.

In Table 6, the column headed 'Activity' shows the percentage of phosphonate species when determined as a percentage of the total reaction mixture. The data for Polymer 1 and Phosphonate 1 were provided by the manufacturer.

TABLE 6

MIC Values for Selected Candidates

| SAMPLE | ACTIVITY (%) | Field I (ppm) | Field II (ppm) | Field III (ppm) |
|---|---|---|---|---|
| EXAMPLE 1 | 40 | 4-8 | 20-30 (3 hr) | <5 (3 hr) |
| EXAMPLE 2 | 41 | <4 | 20-30 (3 hr) | <5 (3 hr) |
| EXAMPLE 3- A (acid, pH < 1) | 37 | N/A | N/A | 40-50 |
| EXAMPLE 3- B (NH$_4$ Salt, pH = 6) | 29 | N/A | N/A | 40-50 |
| EXAMPLE 4- A (acid, pH < 1) | 38 | N/A | N/A | 0-10 |
| EXAMPLE 4- B (NH$_4$ Salt, pH = 6) | 31 | N/A | N/A | 10-20 |
| EXAMPLE 5- A (acid, pH < 1) | 44 | N/A | N/A | 20-30 |
| EXAMPLE 5- B (NH$_4$ Salt, pH = 6) | 28 | N/A | N/A | 0-10 |
| EXAMPLE 7 | 46 | 8-12 | N/A | N/A |
| POLYMER 1 | 25 | 2-4 | ~50 | ~20 |
| PHOSPHONATE 1 | 45 | 6-8 | N/A | N/A |

NOTE:
All hold times are 1 hour unless otherwise stated.

As shown in Table 6, it is usual that the inhibitor MIC varies in accordance with brine composition, temperature, pH and other conditions and also according to the suitability of each inhibitor for the test conditions. Depending on the application method and inhibitor properties it may be preferable that an inhibitor shows an MIC of less than 100 ppm, less than 10 ppm, or less than 1 ppm.

The results presented show that the subjects of this invention are effective inhibitors versus each of the water compositions and conditions shown and, in some cases, show superior performance to current, commercially available scale inhibitors. In other cases, the subjects of this invention show scale inhibitor performance similar to DETA phosphonate.

The foregoing examples and tables show that distinctly higher biodegradation is obtained for alkyl phosphonated amino acid reaction mixtures including greater than 50 weight percent of a partially substituted, alkyl phosphonate species, compared to reaction mixtures containing mainly the fully (tetra) substituted species, all when measured by method OECD 306. The differences in biodegradation are further depicted in FIG. 4, wherein the averaged biodegradation of Examples 1 and 3-5 (where each alkyl phosphonate includes greater than 50 weight percent di-substituted species) is compared with the averaged biodegradation of Examples 2 and 6-9 (where each alkyl phosphonate includes a tetra-substituted to di-substituted ratio greater than 1:1). These same reaction mixtures exhibit unusually low toxicity to algae, i.e. a value of EC$_{50}$ for *Skeletonema costatum* very much greater than 10 mg/L.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer,"  "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of inhibiting scale, comprising:
contacting an aqueous fluid with a scale inhibitor component in an amount effective to inhibit scale, wherein the scale inhibitor component includes at least one alkyl phosphonated amino acid species that comprises greater than 50 weight percent partially substituted, di-alkyl phosphonated amino acid species, and wherein the scale inhibitor component demonstrates greater than about 20% biodegradation in 28 days.

2. The method of claim 1, wherein the di-substituted alkyl phosphonated amino acids species includes an amino acid functionality having four or more active hydrogen.

3. The method of claim 2, wherein the amino acid functionality is synthetic.

4. The method of claim 2, wherein the amino acid functionality is selected from the group consisting of arginine, asparagine, glutamine, histidine, lysine, tryptophan, and combinations thereof.

5. The method of claim 2, wherein the amino acid functionality is lysine.

6. The method of claim 1, wherein the alkyl phosphonated amino acid species are methyl phosphonated amino acid species.

7. The method of claim 1, wherein the scale inhibitor demonstrates greater than about 40% biodegradation in 28 days.

8. The method of claim 1, wherein the scale inhibitor demonstrates greater than about 40% biodegradation in 63 days.

9. The method of claim 1, wherein the scale inhibitor demonstrates greater than about 60% biodegradation in 63 days.

10. The method of claim 5, wherein the at least one alkyl phosphonated lysine species includes greater than 60 weight percent di-substituted alkyl phosphonated lysine.

11. The method of claim 1, wherein the scale inhibitor component has greater biodegradability than a scale inhibitor component including greater than 50 weight percent of a fully-substituted alkyl phosphonated amino acid.

12. The method of claim 1, wherein the at least one alkyl phosphonated amino acid species is in the salt form.

13. The method of claim 12, wherein the at least one alkyl phosphonated amino acid species forms a salt with sodium, potassium, ammonia, monoethanolamine, or combinations thereof.

14. The method of claim 1, wherein the at least one alkyl phosphonated amino acid species is in the acid form.

15. The method of claim 1, wherein the amount effective to inhibit scale establishes a concentration between 1 ppm and 100 ppm in the aqueous fluid.

16. The method of claim 5, wherein the lysine is L-lysine.

17. The method of claim 1, wherein the scale inhibitor is formulated with additives for use in an application selected from oilfield streams, industrial water treatment, laundry, detergents, industrial cleaning, residential cleaning and medical.

18. The method of claim 1, wherein the step of contacting includes controllably adding an aqueous solution having the scale inhibitor dissolved therein through a small diameter tube positioned within a well bore in fluid communication with a subterranean formation.

19. The method of claim 1, wherein the at least one alkyl phosphonated amino acid species includes two or more methyl phosphonated lysine species.

20. The method of claim 1, wherein the at least one alkyl phosphonated amino acid species comprises at least one methyl phosphonated lysine species including greater than about 50 weight percent di-substituted methyl phosphonated lysine.

21. The method of claim 20, wherein the scale inhibitor demonstrates greater than about 40% biodegradation in 28 days.

22. The method of claim 20, wherein the scale inhibitor demonstrates greater than about 60% biodegradation in 28 days.

23. The method of claim 20, wherein the scale inhibitor demonstrates greater than about 60% biodegradation in 63 days.

24. The method of claim 20, wherein the at least one methyl phosphonated lysine species is in the form of a salt prepared by reacting the reaction mixture with monovalent cations, divalent cations, nitrogen containing species, or combinations thereof.

25. The method of claim 20, where the at least one methyl phosphonated lysine species is used for the control of scale in aqueous oilfield fluid.

26. The method of claim 20, wherein the at least one methyl phosphonated lysine species is used for the control of scale in aqueous fluids associated with applications selected from the group consisting of industrial waste water, laundry, detergents, industrial cleaning and household cleaning.

* * * * *